US007918931B2

(12) United States Patent
Endo et al.

(10) Patent No.: US 7,918,931 B2
(45) Date of Patent: *Apr. 5, 2011

(54) CHROMIUM-FREE METAL SURFACE TREATMENT AGENT

(75) Inventors: Yasuhiko Endo, Yokohama (JP); Tomio Sakai, Nagoya (JP)

(73) Assignee: Hoden Meimitsu Kako Kenkyusho Co., Ltd., Atsugi (JP)

( * ) Notice: Subject to any disclaimer, the term of this patent is extended or adjusted under 35 U.S.C. 154(b) by 1407 days.

This patent is subject to a terminal disclaimer.

(21) Appl. No.: 11/391,215

(22) Filed: Mar. 29, 2006

(65) Prior Publication Data
US 2006/0172145 A1 Aug. 3, 2006

Related U.S. Application Data

(63) Continuation of application No. 10/917,397, filed on Aug. 13, 2004, now Pat. No. 7,189,465.

(30) Foreign Application Priority Data

Aug. 15, 2003 (JP) .................................. 2003-293665
Mar. 16, 2004 (JP) .................................. 2004-073736

(51) Int. Cl.
*C09D 183/02* (2006.01)
*C08K 3/18* (2006.01)
(52) U.S. Cl. ................... 106/287.16; 524/381; 524/385; 524/837; 524/847; 524/859; 525/100; 528/34
(58) Field of Classification Search .......................... None
See application file for complete search history.

(56) References Cited

U.S. PATENT DOCUMENTS

| 3,997,501 | A | * | 12/1976 | McLeod | ......................... | 524/100 |
| 4,291,098 | A | * | 9/1981 | Tanaka et al. | ................. | 428/412 |
| 4,330,446 | A | | 5/1982 | Miyosawa | | |
| 4,510,283 | A | * | 4/1985 | Takeda et al. | ................. | 524/356 |
| 5,905,117 | A | * | 5/1999 | Yokotsuka et al. | ........... | 525/104 |
| 6,475,300 | B2 | * | 11/2002 | Shimakura et al. | ........... | 148/247 |
| 6,607,587 | B1 | * | 8/2003 | Kanai et al. | ................. | 106/14.44 |
| 2003/0185990 | A1 | | 10/2003 | Bittner et al. | | |
| 2004/0180223 | A1 | * | 9/2004 | Shibuya et al. | ............... | 428/447 |

FOREIGN PATENT DOCUMENTS

| EP | 1 130 131 A2 | 9/2001 |
| JP | 53-92846 | 8/1978 |
| JP | 53-121034 | 10/1978 |
| JP | 53-121034 A | 10/1978 |
| JP | 58-185660 | * 10/1983 |
| JP | 04-236266 | 8/1992 |
| JP | 04-236266 A | 8/1992 |
| JP | 05-001391 A | 1/1993 |
| JP | 10-046058 | 2/1998 |
| JP | 10-219138 | 8/1998 |
| JP | 10-219138 A | 8/1998 |
| JP | 10-279885 | 10/1998 |
| JP | 10-279885 A | 10/1998 |
| JP | 2000-248374 A | 9/2000 |
| JP | 2000-355790 | 12/2000 |
| JP | 2001-64782 | 3/2001 |
| JP | 2001-064782 A | 3/2001 |
| JP | 2001-232716 | 8/2001 |
| JP | 2001-316845 | 11/2001 |
| JP | 2002-129356 | 5/2002 |
| JP | 2003-155451 A | 5/2003 |
| JP | 2003-160759 A | 6/2003 |
| JP | 2004-204091 A | * 7/2004 |
| WO | WO 00 69976 | 11/2000 |
| WO | WO 03/048403 A1 | 6/2003 |

OTHER PUBLICATIONS

Abstract and selected written translation of JP 58-185660 A (1983).*
Japanese Office Action dated Jan. 8, 2008 issued in counterpart application JP2004-073736.
Japanese Office Action dated Jan. 15, 2008 issued in counterpart application JP2004-052991.

* cited by examiner

*Primary Examiner* — Marc S Zimmer
(74) *Attorney, Agent, or Firm* — Sughrue Mion, PLLC

(57) ABSTRACT

Provided is a chromium-free metal surface treatment agent excellent in rust inhibitive performance which can be used in a surface treatment of metal products, in particular, galvanized metal products. The metal surface treatment agent consists essentially of a siliceous binder solution comprising water and/or alcohol as a solvent, and the concentration of the silica component is 8 to 25% by weight. In particular, a metal surface treatment agent containing an alcoholic solution of alkoxysilane oligomer having a weight averaged molecular weight of 1000 to 10000, which is obtained by hydrolyzed condensation polymerization of alkoxysilane, can suppress the occurrence of white rusting for a long time. It is preferred that 3 to 25 parts by weight of a dispersed nano-sized titanium dioxide powder having an average primary particle size of not more than 70 nm, per 100 parts by weight of the silica component be suspended in the siliceous binder solution. The rust inhibitive performance of the metal surface treatment agent can be further improved by using an alcohol-soluble polyvinyl butyral resin and by adding a silane coupling agent having a vinyl or epoxy group as a functional group, in combination with a dispersed nano-sized powder of titanium dioxide.

8 Claims, No Drawings

CHROMIUM-FREE METAL SURFACE TREATMENT AGENT

This is a continuation of application Ser. No. 10/917,397 filed Aug. 13, 2004 now U.S. Pat. No. 7,189,465. The entire disclosure(s) of the prior application(s), application Ser. No. 10/917,397 is hereby incorporated by reference.

BACKGROUND OF THE INVENTION

1. Field of the Invention

The present invention relates to a chromium-free metal surface treatment agent, which can replace a metal surface treatment that has been performed with a metal surface treatment agent containing chromate, in particular, chromate treatment of galvanized metal products, and the chromium-free metal surface treatment agent has excellent rust inhibitive performance compared with chromate treatment, and is able to prevent white rusting for a long time.

2. Description of the Related Art

The chromate treatment utilizes a metal-surface treatment agent containing chromic acid and has hitherto been used to improve the rust inhibitive performance of galvanized metal products. But because of the toxicity and carcinogenicity of hexavalent chromium component, the appearance of a chromium-free metal surface treatment agent has been strongly desired. For example, because the shredder dust of waste vehicles contains hexavalent chromium components derived from the chromate treated galvanized metal products, the waste disposal and recycling of the shredder dust are difficult.

If a chromium-free metal surface treatment agent having better performances than chromate treatment agents is excellent in cost performances, it is possible to avoid the chromate treatment and the chromium-free metal surface treatment agent is expected to contribute to the prevention of environmental pollution.

Although metal surface treatment agents containing a small amount of hexavalent chromium components and metal surface treatment agents utilizing a trivalent chromium component instead of a hexavalent chromium component are used at present, they are inferior in performances and the trivalent chromium can change to hexavalent chromium. Therefore, the use of these metal surface treatment agents cannot be said to be fundamental measures.

Several chromium-free metal surface treatment agents have already been proposed and some exhibit considerable performances. At present, they still have problems; for example, rust inhibitive performance equivalent to that obtained by chromate treatment cannot be obtained, they are not easy to use, white rusting is liable to occur, the self-repair function is poor, and the like.

For example, Japanese Laid-Open Patent JP 53-121034 A discloses metal surface treatment agents composed of a water reducible chromium-free aqueous solution of a silica complex. And, Japanese Laid-Open Patent JP 53-92846 A discloses a surface treatment method which comprises involves applying an aqueous solution of a silica complex formed from water dispersible silica, a water soluble or water dispersible acrylic copolymer and an alkoxysilane compound to a surface of a galvanized metal product.

Japanese Laid-Open Patent JP 10-46058 A mentions a metal surface treatment agent (water-based and solvent-based), which is mainly composed of silica such as silicates and colloidal silica, for surface treatment of steel products which are painted with a rust inhibitive paint containing a zinc powder as a rust inhibitive pigment. But, the examples of the Laid-Open Patent only include a water reducible metal surface treatment agent containing sodium silicate that is applied to a film of a rust inhibitive coating containing a zinc powder as a rust inhibitive pigment.

Japanese Laid-Open Patent JP 2000-355790 A discloses a chromium-free surface-treated galvanized steel sheet to which surface a galvanized layer having low impurity contents of Pb, Cu and Ag is formed by controlling the composition of a galvanizing bath, and a water reducible surface treatment solution containing silicates, colloidal silica, etc. is applied to the surface of galvanized layer, thereby improving white rusting resistance.

Japanese Laid-Open Patent JP 10-219138 A discloses a method of applying a top-coat layer which contains an inorganic filler, and an aqueous binder solution of silicates and/or colloidal silica, and the top-coat is formed on a surface of a ferrous substrate which is galvanized or painted by a zinc-rich paint. These water reducible surface treatment agents exhibits good performances to prevent the occurrence of red rusting, although there is the problem that white rusting is liable to occur.

Japanese Laid-Open Patent JP 2001-64782 A discloses rust inhibitive coatings in which oxide films of Si, Al or Ti are formed by the sol-gel method on hot-dip galvanized steel surfaces. In a silica coating described in the specification of the Laid-Open Patent, a galvanized steel plate is immersed in an alkoxide solution in a sol state (an alcoholic solution of an alkoxysilane oligomer which is obtained by mixing a small amount of water and hydrochloric acid to an alcoholic solution of tetraethoxysilane, and performing hydrolysis followed by condensation polymerization), pulled up, dried and baked, thereby forming the coating. However, the progress of condensation polymerization seems to be insufficient. White rusting occurred in 12 hours in the salt spray test described in the examples of the patent and the rust inhibitive performance was poor.

Furthermore, Japanese Laid-Open Patent JP 2001-232716 A discloses a corrosion resisting surface-treated galvanized steel sheet in which a base coating essentially formed from a silicate compound, such as an alkoxysilane compound including a silane coupling agent, a fluoride containing resin, such as fluorotitanic acid, and a phosphate compound. The base coating is formed on the galvanized steel sheet and a resin coating is formed as a top-layer.

Japanese Laid-Open Patent JP 2001-316845 A discloses a water reducible chromium-free metal surface treatment agent, the purpose of which is the rust inhibitive treatment of galvanized steels etc., which contains a silane coupling agent and/or its hydrolyzed condensation polymerization product, water dispersible silica, a zirconium compound and/or a titanium compound, a compound containing a thiocarbonyl group and/or a water soluble acrylic resin.

Japanese Laid-Open Patent JP 2002-129356 A discloses a water reducible coating composition effective in preventing the white rusting of hot-dip galvanized steels which consists essentially of a quaternary ammonium silicate, an inorganic filler, a synthetic resin emulsion and/or a water soluble synthetic resin, water and/or a hydrophilic organic solvent. In the examples of the Laid-Open Patent, there is described a composition in which a powder of pigment grade titanium dioxide having an average particle size of 0.5 μm is mixed. The weathering resistance of samples is investigated by use of a sunshine carbon arc type weather meter by applying the composition to commercially available hot-dip galvanized steel sheets.

Also, Japanese Laid-Open Patent JP 10-279885 A discloses a composition for a functional coating, the purpose of which is to impart various functions by application to surfaces of various types of materials, such as metals, ceramics, resins and wood, which consists of organoalkoxysilane or its hydrolyzed condensation polymerization product, a synthetic resin, a fine-grained metal oxide and/or carbon black, any one of a silver salt, a copper salt and colloidal silver, a hydrophilic organic solvent and water. Adhesion, impact resistance, good flexural properties, weathering resistance, heat resistance, chemical resistance, corrosion resistance, pollution resistance, electrical insulation, antibacterial properties, reducibility, liquid modifying properties, lipolytic properties, anticharging properties, etc. are enumerated as the various functions of the coating. In the examples in the Laid-Open Patent, a composition containing a nano-sized particle of titanium dioxide (titania) is mentioned and the use of a condensation polymerization product of organoalkoxysilane oligomer is suggested. However, the examples do not describe about a composition in which organoalkoxysilane oligomer is formed beforehand (it is explained that condensation polymerization is made after application). Also, although acid resistance and alkali resistance are investigated by adding an acid aqueous solution and an alkaline aqueous solution dropwise from above, rust inhibitive performance which is usually evaluated by the salt spray test is not mentioned.

SUMMARY OF THE INVENTION

Therefore, an object of the present invention is to provide a chromium-free metal surface treatment agent which remarkably improves rust inhibitive performance by treating surfaces of metal products, in particular, galvanized metal products, and to provide a chromium-free metal surface treatment agent which surpasses conventional chromate treatment agents in rust inhibitive performance of galvanized metal products cost-effectively.

Another object of the present invention is to provide a chromium-free metal surface treatment agent which can remarkably improve rust inhibitive performance when used in the surface treatment of galvanized metal products and is excellent in the effect of suppressing the occurrence of, in particular, white rusting for a long time.

A chromium-free metal surface treatment agent of the present invention comprises, as a main component, a silica-based binder solution which has water and/or alcohol as a solvent, and the silica-based binder solution has 8 to 25% by weight of silica components.

It is preferred that in the silica-based binder solution, 3 to 25 parts by weight of a dispersed nano-sized powder of titanium dioxide per 100 parts by weight of silica components contained in the silica-based binder solution be suspended in the silica-based binder solution and that primary particles of the nano-sized titanium dioxide have an average particle size of not more than 70 nm. It is more preferred that 5 to 20 parts by weight of a dispersed nano-sized powder of titanium dioxide per 100 parts by weight of silica components contained in the silica-based binder solution be suspended in the silica-based binder solution and that primary particles of the nano-sized titanium dioxide have an average particle size of not more than 40 nm.

The chromium-free metal surface treatment agent of the present invention can contain, as an essential component, an alcoholic solution of alkoxysilane oligomer having a weight averaged molecular weight of 1000 to 10000, which is obtained by hydrolyzed condensation polymerization of alkoxysilane. It is preferred that the alkoxysilane be tetraalkoxysilane. And it is preferred that the alcoholic solution further comprise an effective amount of alcohol-soluble resin component. It is more preferred that the alcohol-soluble resin component be polyvinyl butyral.

It is preferred that in the chromium-free metal surface treatment agent of the present invention, the alcoholic solution comprise an effective amount of silane coupling agent having a vinyl or epoxy group as a functional group.

It is more preferred that in the chromium-free metal surface treatment agent of the present invention, 5 to 35% by weight of the alcohol contained in the silica-based binder solution be an alcohol having a boiling point higher than 115° C. It is more preferred that the above-described high boiling alcohol be glycol ether.

In the chromium-free metal surface treatment agent of the present invention, the silica-based binder solution can be a solution which has water as a solvent. In this case, it is preferred that an effective amount of wetting agent which improves wettability with respect to a surface of a treated metal product be added in the silica-based binder solution.

It is preferred that the chromium-free metal surface treatment agent of the present invention which has water as a solvent, simultaneously comprise, as part of the silica-based binder solution, a water soluble silane coupling agent having an epoxy group as a functional group.

In the chromium-free metal surface treatment agent of the present invention, the silica-based binder solution can be an alcoholic solution.

It is preferred that in the chromium-free metal surface treatment agent of the present invention, the silica-based binder solution comprise not less than 15% by weight of silica components.

The chromium-free metal surface treatment agent of the present invention is suitable for forming a coating on a galvanized steel product, in particular an electro-galvanized steel product.

In the chromium-free metal surface treatment agent of the present invention, the occurrence of not only red rusting, but also white rusting can be prevented for a long time by forming a coating of a metal surface treatment agent of about 2 µm thick. Furthermore, the chromium-free metal surface treatment agent of the present invention is free from the defect peculiar to chromate-treated products that the rust inhibitive function is impaired at about 70° C. And since the chromium-free metal surface treatment agent of the invention can be baked in a wide temperature range of 150° C. to 250° C., it provides the advantage that heat treatment performed to prevent hydrogen embrittlement resulting form galvanizing can be performed at the same time with the baking treatment of the metal surface treatment agent. Compared to a coating method of rust inhibitive paint used in fasteners, which involves repeated operation of applying a chromium-free water reducible rust inhibitive paint including a zinc powder as a rust inhibitive pigment by the dip-spin method and baking the applied film of the chromium-free water reducible rust inhibitive paint, a method which comprises applying the chromium-free metal surface treatment agent of the present invention to a galvanized surface by the dip-spin method and baking this coating of the chromium-free metal surface treatment agent only once is excellent in cost-effectiveness. The coating of the chromium-free metal surface treatment agent has the advantages that it is excellent in adhesion to a galvanized metal surface and that the coefficient of friction of a treated surface is at almost the same levels as that of conventional galvanized products subjected to chromate treatment. When the chromium-free metal surface treatment agent of the present invention is combined with electro-galvanizing, a thin rust inhibitive film having a thickness of not more than 10 µm including the plating thickness can exhibit an excellent rust inhibitive performance. Therefore, the chromium-free metal surface treatment agent is especially suitable for the rust inhibitive treatment of galvanized fasteners such as bolts and nuts.

Also, the chromium-free metal surface treatment agent of the present invention is suitable for forming a top-coating on a product painted with a chromium-free zinc-rich paint, which contains a zinc powder as a rust inhibitive pigment, instead of galvanizing. Application of the metal surface treatment agent is also useful to improve rust inhibitive performance of a conventionally treated surface of galvanized metal products.

DETAILED DESCRIPTION OF THE PREFERRED EMBODIMENTS

It is possible to use a silica sol solution which has water as a major solvent and/or a silica sol solution which has alcohol as a major solvent, as the silica-based binder solution used in a chromium-free metal surface treatment agent of the present invention. A commercially available aqueous solution of silica sol can be used as the silica-based binder solution which has water as a major solvent. In this case, it is preferable to use a silica sol solution in which the average particle size of colloid particles of silica is as fine as not more than 15 nm and the bonding strength is large. And it is preferable to use a silica sol solution in which the silica solid content is 8 to 25% by weight in order to provide a sufficient thickness of a treated coating film covering a surface of a galvanized steel product.

It is possible to use an alcoholic solution of alkoxysilane oligomer as the silica-based binder of a chromium-free metal surface treatment agent of the present invention. It is preferable to use alkoxysilane oligomer having a weight averaged molecular weight (Mw) of 1000 to 10000. If the weight averaged molecular weight (Mw) of alkoxysilane oligomer is less than 1000, the effect of suppressing white rusting becomes poor. The weight averaged molecular weight (Mw) of alkoxysilane oligomer is preferably not less than 1500. If the weight averaged molecular weight (Mw) of alkoxysilane oligomer is larger than 10000, the alkoxysilane oligomer solution becomes unstable and tends to gel. Hence this is undesirable. If gelation occurs before application, the rust inhibitive performance of a metal surface treatment agent is impaired. The weight averaged molecular weight (Mw) of alkoxysilane oligomer is preferably not more than 9000. The weight averaged molecular weight (Mw) of alkoxysilane oligomer is measured by a gel permeation chromatography on the basis of polystyrene polymers of known molecular weights by use of tetrahydrofuran as a solvent. Tetraalkoxysilane and alkyltrialkoxysilane can be used as a starting material for alkoxysilane oligomer. However, because commercially available products can be easily obtained, it is desirable to use tetraalkoxysilane as the starting material of alkoxysilane oligomer. For the same reason, it is desirable to use those having a carbon number of 1 to 3 as alkyl groups of a starting material.

If the concentration of alkoxysilane oligomer in an alcoholic solution is low, a formed coating becomes thin and the rust inhibitive effect of a metal surface treatment agent becomes poor. If the concentration is too high, the solution becomes unstable and tends to gel, the viscosity of the solution increases and the thickness of an applied coating increases, with the result that the consumption of the metal surface treatment agent increases and this is uneconomical. Therefore, the concentration of alkoxysilane oligomer in an alcoholic solution is preferably 8 to 25% by weight of silica components.

In the present invention, the "silica components contained in a silica-based binder solution" means oxide components when a silica-based binder containing silicon has been applied and solidified.

A water reducible silica-based binder solution can partially contain a water soluble silane coupling agent and a dissimilar binder solution, such as alumina sol. When the dissimilar binder solution is mixed, it is necessary to pay attention to changes in pH so that the binder sol solution does not gel. A water-soluble silane coupling agent having an epoxy group as a functional group is desirable, because it does not induce the gelation of the binder sol solution and a metal surface treatment agent having good rust inhibitive performance is obtained.

If the gelation of the binder sol solution of a prepared metal surface treatment agent proceeds, the rust inhibitive effect of the metal surface treatment agent tends to be impaired. Therefore, in order to ensure the pot life of a metal surface treatment agent, it is desirable to select stable compositions and storage conditions under which gelation does not occur. For example, by storing a metal surface treatment agent by being cooled in a refrigerator, it is possible to extend the pot life of the metal surface treatment agent.

The addition of an effective amount of dispersed nano-sized powder of titanium dioxide having an average particle size of primary particles of less than 70 nm to a silica-based binder solution is effective in improving the rust inhibitive performance of a formed coating and also useful for strengthening the coating and adjusting the coefficient of friction of the coating. The desirable amount of a nano-sized powder of titanium dioxide added to a metal surface treatment agent is preferably 3 to 25 parts by weight per 100 parts by weight of silica components contained in the silica-based binder solution, more preferably 5 to 20 parts by weight per 100 parts by weight. If the added amount is too small, the effect of addition is not obtained. If the added amount is too large, besides the whitening of a formed coating, the cost increases and this is uneconomical. Commercially available nano-sized powders of titanium dioxide for photocatalysts can be used as the nano-sized powder of titanium dioxide. Although the average particle size of primary particles of nano-sized titanium dioxide powders for photocatalysts is usually 5 to 50 nm or so, dispersion treatment is necessary because they are mostly composed of secondary particles.

When a water reducible silica sol solution is used as the binder, it is preferred to use a titanium dioxide slurry of nano-sized powder which is subjected to dispersion treatment to which water is mixed. When a silica-based binder of an alcohol solvent is used, it is preferred to use titanium dioxide slurry of nano-sized powder which is subjected to dispersion treatment to which alcohol is blended.

Also, it is preferred that the nano-sized powder of titanium dioxide to be added to a silica-based binder have an average primary particle size of not more than 40 nm. When a nano-sized powder of titanium dioxide is present in a coating in a well-dispersed state, the nano-sized powder of titanium dioxide scarcely scatters visible rays and, a formed coating of a metal surface treatment agent becomes clear and colorless.

Because a nano-sized powder of titanium dioxide is formed of ultra-fine particles, the surface of the titanium dioxide particles is in an active state. In a metal surface treatment agent of the present invention, the oxidation action of active oxygen generated by the presence of active titanium dioxide in the coating is considered to take part in a protective coating of a similar chemical action to that caused by the hexavalent chromic compound which is an oxidizer, and it might be thought that the rust inhibitive performance of galvanized products is remarkably improved by a cooperative action with a siliceous matrix of a protective coating by a silica-based binder.

In the case of a water reducible chromium-free metal surface treatment agent, wettability of a surface to be treated may sometimes be poor. If a surface which is not wetted by the metal surface treatment agent remains on a galvanized product, a protective coating is not formed in this portion and it is impossible to ensure the rust inhibitive performance of the whole surface. Therefore, it is preferred that a wetting agent be added to a water reducible chromium-free metal surface treatment agent so that the surface to be treated is all wetted. It is desirable to use, as the wetting agent, a small amount of acetylene diol derivative, such as Dynol 604, Surfinol SE and Olfin SPC (all being products of Nisshin Chemical Industry Co., Ltd.), which are foaming wetting agents which generate little foams. Because the wetting agent is effective also as a dispersant of a nano-sized powder of titanium dioxide, it is preferable to add the wetting agent beforehand when a nano-sized titanium dioxide powder slurry is subjected to dispersion treatment.

In the case of a chromium-free metal surface treatment agent of an alcohol solvent, the wettability of the agent to an article to be applied is usually good and the surface treatment agent can be applied to a galvanized surface in an as-galvanized condition even when a surfactant or a wetting agent is not added. However, when a nano-sized powder of titanium dioxide is apt to settle because of its poor dispersibility, a dispersant which is effective in an alcohol solvent, such as BYK 110 (made by BYK Chemie), can be added.

It is possible to dissolve beforehand resin components soluble in alcohol, such as polyvinyl butyral resin and phenol resin, in an alcoholic solution of alkoxysilane oligomer, and by dissolving one of these resin components the rust inhibitive performance of a metal surface treatment agent can be further improved. By changing the dissolved amounts of the resin component, it is possible to adjust the viscosity of the metal surface treatment agent, to improve the adhesion of a coating to the substrate, and to adjust the hardness and lubricity of a coating. When a metal surface treatment agent is applied to electro-galvanized fasteners, it is desirable to use polyvinyl butyral resin which can impart appropriate lubricity to the treated fasteners. When a resin is dissolved in a metal surface treatment agent, it is necessary to appropriately select the type of the resin and the polymerization degree of the resin so that the metal surface treatment agent does not gel. For the polyvinyl butyral, it is desirable to use one which does not have a high molecular weight. The adequate concentration of a resin dissolved beforehand in an alcoholic solution of a metal surface treatment agent, which depends on the type and molecular weight of the resin, is usually 0.2 to 2% by weight, more preferably 0.3 to 1.0% by weight.

When a resin is used in a metal surface treatment agent in order to improve the adhesion of a formed coating to the substrate and to decrease the hardness of the formed coating, it is desirable to use an effective amount of a silane coupling agent in combination. As the silane coupling agent, it is desirable to use a silane coupling agent which has, as a functional group, a vinyl group or an epoxy group which is less apt to cause the gelation of the metal surface treatment agent. The amount of added silane coupling agent depends on the amount of the resin used in combination, but is preferably selected in the range of 1 to 10% by weight of the metal surface treatment agent.

A silica-based binder alcoholic solution contains a large amount of low boiling point alcohol. Because an alkoxysilane oligomer solution is usually produced by the hydrolyzed condensation polymerization of tetraethoxysilane solution as a starting material, large amounts of ethyl alcohol, isopropyl alcohol, etc. are contained in the alkoxysilane oligomer solution. However, these low boiling point alcohols are apt to evaporate quickly. Therefore, when these alcohols evaporate from a container of a metal surface treatment agent having an open upper part, solid siliceous components adhere to the upper walls of the container and become foreign matter when they exfoliate and fall off. Further when the metal surface treatment agent is applied in an environment of high humidity, these alcohols evaporate quickly by depriving heat from the substrate and dew condensation occurs on the surface of the substrate. If dew condensation occurs on a surface of the substrate, the metal surface treatment agent gels and the rust inhibitive performance of a coating is impaired.

Therefore, it is desirable to avoid dew condensation by mixing 5 to 35% by weight of a high boiling point alcohol having a boiling point higher than 115° C. into the metal surface treatment agent, and it is more desirable to mix 10 to 30% by weight of such a high boiling point alcohol. High boiling point alcohols capable of being used include ethyl Cellosolve, butyl Cellosolve, propylene glycol monomethyl ether, propylene glycol monoethyl ether, etc. in addition to normal butyl alcohol. Propylene glycol monomethyl ether and propylene glycol monoethyl ether have low toxicity and are desirable high boiling point alcohols not described in the PRTR list.

In adding a high boiling point alcohol to a metal surface treatment agent, it is desirable to use the high boiling point alcohol as a dispersive medium for a nano-sized titanium dioxide powder, which is subjected to dispersion treatment, and to use the high boiling point alcohol as a solvent for dissolving a resin, which is soluble in alcohol. In this case, it is desirable to prepare beforehand an alcoholic solution in which a dispersed nano-sized titanium dioxide powder or a resin is dissolved and to use this alcoholic solution in the blending of a metal surface treatment agent.

A chromium-free metal surface treatment agent of the present invention is suitable for forming a coating on a galvanized steel product and particularly suitable for electro-galvanized steel products. Types of galvanizing include electro-galvanizing, hot-dip galvanizing, hot-dip galvannealing, etc. There are also many types of plating baths used in electro-galvanizing. By applying a chromium-free metal surface treatment agent of the present invention to surfaces of metal products which are galvanized by the various methods instead of chromate treatment, excellent rust inhibitive performance which cannot be obtained from chromate treatment can be imparted to the galvanized metal products.

In electro-galvanizing, the adjustment of the plating thickness is easy. When a coating of a chromium-free metal surface treatment agent of the present invention is applied to a surface of a galvanized product, having a plated layer of not more than 7 μm, and baked, the formation of a rust inhibitive layer of not more than 10 μm thick in total makes it possible to suppress the occurrence of red rusting for over 2000 hours in the salt spray test and also to suppress the formation of white rusting for over 300 hours. Compared to a method by which a rust inhibitive paint containing a flaky zinc powder as a rust inhibitive pigment is applied twice to steel fasteners by the dip-spin method, the overall cost of rust inhibitive coating can be reduced by combining electro-galvanizing with a metal surface treatment agent of the present invention. Therefore, the chromium-free metal surface treatment agent of the present invention is suitable for the surface treatment of electro-galvanized products and, in particular, electro-galvanized fasteners.

Furthermore, the chromium-free metal surface treatment agent of the present invention can also be used as a metal surface treatment agent which is applied to a paint coating of a chromium-free zinc-rich paint which uses, as a rust inhibitive pigment, a flaky zinc powder or a mixture of a flaky aluminum powder and a flaky zinc powder, and it is possible to ensure rust inhibitive performance of preventing white rusting for a long time. Also, a metal surface treatment agent of the present invention can be applied to a surface of a chromium-free zinc-rich paint which uses a granular zinc powder as a rust inhibitive pigment, and not only the occurrence of red rusting, but also the occurrence of white rusting can be suppressed for a long time. It is preferred that a zinc-rich paint comprise a water reducible binder solution and 10 to 60% by weight of a flaky zinc powder, which is dispersed in the water reducible binder solution as a rust inhibitive pigment. It is preferred that the flaky zinc powder contain an effective amount of a flaky metal aluminum powder. It is preferred that the water reducible binder solution contain, per 100 parts by weight of a flaky zinc powder, 0.4 to 5 parts by weight of a water reducible resin emulsion as an amount converted to a resin component and 2 to 60 parts by weight of a water soluble silane coupling agent.

A metal surface treatment agent is applied to small-sized fasteners usually by the dip-spin method. However, when it is applied to galvanized steel sheets, large-sized galvanized products or large-sized products coated by a zinc-rich paint, it is also possible to use a spray method or to use a roller in addition to the dip drain method. The baking of a metal surface treated film should usually be performed at 150 to 250° C. for 10 to 20 minutes or so, and it is desirable to change conditions according to the size and the use of products.

The present invention will be specifically described by EXAMPLES below. However, the present invention is not limited to the following EXAMPLES.

EXAMPLES 1 to 26 and COMPARATIVE EXAMPLES 1 to 7 will be described below. TABLES 1 to 5 summarize the compositions of each metal surface treatment agent and results of the slat spray test of galvanized M8 hexagon headed bolts to which these surface treatment agents for metals were applied. For the description of each of EXAMPLES, the preparation and application of the metal surface treatment agent are described in detail in EXAMPLE 1, and changed parts are described in the descriptions of EXAMPLE 2 and later examples.

TABLE 1

| Composition of metal surface treatment agent (parts by weight) | EXAMPLE | | | | | | |
|---|---|---|---|---|---|---|---|
| | 1 | 2 | 3 | 4 | 5 | 6 | 7 |
| Silica-based binder | | | | | | | |
| Alkoxysilane oligomer 1 (Mw: 2240) | 72 | 72 | 72 | 70 | 64 | 64 | 64 |
| Alkoxysilane oligomer 2 (Mw: 5350) | | | | | | | |
| Alkoxysilane oligomer 3 (Mw: 8070) | | | | | | | |
| Alkoxysilane oligomer 4 (Mw: 760) | | | | | | | |
| Water-based silica sol binder | | | | | | | |
| Silica-based sol-gel binder | | | | | | | |
| Water reducible colloidal silica binder | | | | | | | |
| Methanol-dispersed colloidal silica | | | | | | | |
| Silane coupling agent | | | | | 8 | 8 | 8 |
| Nano-sized powder of titanium dioxide | | | | | | | |
| Average particle size of primary particles (nm) | | | | | | | |
| Resin | | | | | | | |
| Polyvinyl butyral resin | | | | 0.5 | 0.8 | 0.8 | 0.8 |
| Phenol resin | | | | | | | |
| High boiling alcohol | | | | | | | |
| Ethyl Cellosolve | 8 | | | 9.5 | 7.2 | 7.2 | 7.2 |
| Butyl Cellosolve | | 8 | | | | | |
| Propylene glycol monomethyl ether | | | 8 | | | | |
| Isopropyl alcohol | | | | | | | |
| Water | | | | | | | |
| Wetting agent (mg) | | | | | | | |
| Total (parts by weight) | 80 | 80 | 80 | 80 | 80 | 80 | 80 |
| Total of silica components (parts by weight) | 14.4 | 14.4 | 14.4 | 14 | 14.8 | 14.8 | 14.8 |
| Total of silica components (% by weight) | 18 | 18 | 18 | 17.5 | 18.5 | 18.5 | 18.5 |
| Amount of mixed titanium (parts by weight/100 parts by weight of silica components) | 0 | 0 | 0 | 0 | 0 | 0 | 0 |
| Results of salt spray test (hours) | | | | | | | |
| Time to white rusting | 408 | 336 | 324 | 552 | 348 | 528 | 552 |
| Time to red rusting | >2000 | >2000 | >2000 | >2000 | >2000 | >2000 | >2000 |

Note)
*: including alumina component

TABLE 2

| Composition of metal surface treatment agent (parts by weight) | EXAMPLE 8 | 9 | 10 | 11 | 12 | 13 | 14 |
|---|---|---|---|---|---|---|---|
| Silica-based binder | | | | | | | |
| Alkoxysilane oligomer 1 (Mw: 2240) | 60 | | | 70 | 65 | 70 | |
| Alkoxysilane oligomer 2 (Mw: 5350) | | 70 | | | | | 70 |
| Alkoxysilane oligomer 3 (Mw: 8070) | | | 72 | | | | |
| Alkoxysilane oligomer 4 (Mw: 760) | | | | | | | |
| Water-based silica sol binder | | | | | | | |
| Silica-based sol-gel binder | | | | | | | |
| Water reducible colloidal silica binder | | | | | | | |
| Methanol-dispersed colloidal silica | | | | | | | |
| Silane coupling agent | 5 | 5 | | 5 | 5 | 5 | 5 |
| Nano-sized powder of titanium dioxide | | | | 0.7 | 1.3 | 1.3 | 1.3 |
| Average particle size of primary particles (nm) | | | | 15 | 15 | 15 | 15 |
| Resin | | | | | | | |
| Polyvinyl butyral resin | | 0.5 | | 0.5 | 05 | 0.5 | 0.5 |
| Phenol resin | 1 | | | | | | |
| High boiling alcohol | | | | | | | |
| Ethyl Cellosolve | | 4.5 | 8 | | 16.2 | | 11.2 |
| Butyl Cellosolve | | | | | | 16.2 | |
| Propylene glycol monomethyl ether | 14 | | | 12.8 | | | |
| Isopropyl alcohol | | | | | | | |
| Water | | | | | | | |
| Wetting agent (mg) | | | | | | | |
| Total (parts by weight) | 80 | 80 | 80 | 89 | 88 | 93 | 88 |
| Total of silica components (parts by weight) | 13.3 | 13.9 | 7.2 | 15.3 | 14.3 | 15.3 | 13.9 |
| Total of silica components (% by weight) | 16.6 | 17.3 | 9.0 | 17.2 | 16.2 | 16.4 | 15.7 |
| Amount of mixed titanium (parts by weight/100 parts by weight of silica components) | 0 | 0 | 0 | 4.6 | 9.1 | 8.5 | 9.4 |
| Results of salt spray test (hours) | | | | | | | |
| Time to white rusting | 408 | 432 | 324 | 624 | 624 | 372 | 348 |
| Time to red rusting | >2000 | >2000 | >2000 | >2000 | >2000 | >2000 | >2000 |

Note)
*: including alumina component

TABLE 3

| Composition of metal surface treatment agent (parts by weight) | EXAMPLE 15 | 16 | 17 | 18 | 19 | 20 | 21 |
|---|---|---|---|---|---|---|---|
| Silica-based binder | | | | | | | |
| Alkoxysilane oligomer 1 (Mw: 2240) | 70 | | | | | | |
| Alkoxysilane oligomer 2 (Mw: 5350) | | | | | | | |
| Alkoxysilane oligomer 3 (Mw: 8070) | | | | | | | |
| Alkoxysilane oligomer 4 (Mw: 760) | | | | | | | |
| Water-based silica sol binder | | | 80 | | 80 | | |
| Silica-based sol-gel binder | | 80 | | 80 | | 80 | |
| Water reducible colloidal silica binder | | | | | | | 80 |
| Methanol-dispersed colloidal silica | | | | | | | |
| Silane coupling agent | 5 | | | | | | |
| Nano-sized powder of titanium dioxide | 1.3 | 2.7 | 3.1 | 3.8 | 3.1 | 2.5 | 2.5 |
| Average particle size of primary particles (nm) | 8 | 30 | 30 | 17 | 17 | 30 | 30 |
| Resin | | | | | | | |
| Polyvinyl butyral resin | 0.5 | | | | | | |
| Phenol resin | | | | | | | |
| High boiling alcohol | | | | | | | |
| Ethyl Cellosolve | 11.2 | | | | | | |
| Butyl Cellosolve | | | | | | | |
| Propylene glycol monomethyl ether | | | | | | | |
| Isopropyl alcohol | | 13.3 | | 16.2 | | | |

TABLE 3-continued

| Composition of metal surface treatment agent (parts by weight) | EXAMPLE | | | | | | |
|---|---|---|---|---|---|---|---|
| | 15 | 16 | 17 | 18 | 19 | 20 | 21 |
| Water | | | 16.9 | | 16.9 | 13.5 | 13.5 |
| Wetting agent (mg) | | | 68 | | 68 | 68 | 68 |
| Total (parts by weight) | 88 | 96 | 100 | 100 | 100 | 96 | 96 |
| Total of silica components (parts by weight) | 15.3 | 16* | 16 | 16* | 16 | 16* | 16 |
| Total of silica components (% by weight) | 17.3 | 16.7 | 16 | 16 | 16 | 16.7 | 16.7 |
| Amount of mixed titanium (parts by weight/100 parts by weight of silica components) | 8.5 | 16.9 | 19.4 | 24 | 19.4 | 15.6 | 15.6 |
| Results of salt spray test (hours) | | | | | | | |
| Time to white rusting | 324 | 192 | 72 | 216 | 72 | 72 | 72 |
| Time to red rusting | >2000 | 1574 | >2000 | >2000 | 1752 | 1646 | 1368 |

Note)
*including alumina component

TABLE 4

| Composition of metal surface treatment agent (parts by weight) | EXAMPLE | | | | |
|---|---|---|---|---|---|
| | 22 | 23 | 24 | 25 | 26 |
| Silica-based binder | | | | | |
| Alkoxysilane oligomer 1 (Mw: 2240) | | | | 65 | 80 |
| Alkoxysilane oligomer 2 (Mw: 5350) | | | | | |
| Alkoxysilane oligomer 3 (Mw: 8070) | | | | | |
| Alkoxysilane oligomer 4 (Mw: 760) | | | | | |
| Water-based silica sol binder | | | | | |
| Silica-based sol-gel binder | | | | | |
| Water reducible colloidal silica binder | 80 | 80 | 72 | | |
| Methanol-dispersed colloidal silica | | | | | |
| Silane coupling agent | | | 8 | 5 | |
| Nano-sized powder of titanium dioxide | 2.7 | 1.3 | 1.3 | 1.3 | 1.3 |
| Average particle size of primary particles (nm) | 8 | 8 | 15 | 15 | 15 |
| Resin | | | | | |
| Polyvinyl butyral resin | | | | 0.5 | |
| Phenol resin | | | | | |
| High boiling alcohol | | | | | |
| Ethyl Cellosolve | | | 6.7 | 16.2 | 6.7 |
| Butyl Cellosolve | | | | | |
| Propylene glycol monomethyl ether | | | | | |
| Isopropyl alcohol | | | | | |
| Water | 13.3 | 6.7 | | | |
| Wetting agent (mg) | 68 | 68 | 68 | | |
| Total (parts by weight) | 96 | 88 | 88 | 88 | 88 |
| Total of silica components (parts by weight) | 16 | 16 | 16.4 | 14.3 | 16 |
| Total of silica components (% by weight) | 16.7 | 18.2 | 18.6 | 16.2 | 18.2 |
| Amount of mixed titanium (parts by weight/100 parts by weight of silica components) | 16.9 | 8.1 | 7.9 | 9.1 | 8.1 |
| Results of salt spray test (hours) | | | | | |
| Time to white rusting | 72 | 72 | 168 | 648 | 360 |
| Time to red rusting | 1752 | 1368 | >2000 | >2000 | >2000 |

Note)
*: including alumina component

TABLE 5

| Composition of metal surface treatment agent (parts by weight) | COMPARATIVE EXAMPLE | | | | | | |
|---|---|---|---|---|---|---|---|
| | 1 | 2 | 3 | 4 | 5 | 6 | 7 |
| Silica-based binder | Galvanizing without chromate treatment | Galvanizing and yellow chromate treatment | | Silane coupling agent | | | |
| Alkoxysilane oligomer 1 (Mw: 2240) | | | | | | | |
| Alkoxysilane oligomer 2 (Mw: 5350) | | | | | | | |
| Alkoxysilane oligomer 3 (Mw: 8070) | | | | | | | |
| Alkoxysilane oligomer 4 (Mw: 760) | | | | | 72 | | |
| Water-based silica sol binder | | | | | | | |
| Silica-based sol-gel binder | | | | | | | |
| Water reducible colloidal silica binder | | | | | | 80 | 80 |
| Methanol-dispersed colloidal silica | | | 72 | | | | |
| Silane coupling agent | | | | | | | |
| Nano-sized powder of titanium dioxide | | | | | | 2.7** | |
| Average particle size of primary particles (nm) | | | | | | 33 | |
| Resin | | | | | | | |
| Polyvinyl butyral resin | | | | | | | |
| Phenol resin | | | | | | | |
| High boiling alcohol | | | | | | | |
| Ethyl Cellosolve | | | | | 8 | | |
| Butyl Cellosolve | | | | | | | |
| Propylene glycol monomethyl ether | | | | | | | |
| Isopropyl alcohol | | | 8 | | | | |
| Water | | | | | | 13.3 | |
| Wetting agent (mg) | | | | | | 68 | 68 |
| Total (parts by weight) | | | 80 | | 80 | 96 | 80 |
| Total of silica components (parts by weight) | | | 28.8 | | 28.8 | 16 | 16 |
| Total of silica components (% by weight) | | | 36 | | 36 | 16.7 | 20 |
| Amount of mixed titanium (parts by weight/100 parts by weight of silica components) | 0 | 0 | 0 | 0 | 0 | 0 | 0 |
| Results of salt spray test (hours) | | | | | | | |
| Time to white rusting | 24 | 216 | 192 | 192 | 264 | 48 | 48 |
| Time to red rusting | 168 | 1008 | 1056 | 264 | 1008 | 168 | 912 |

Note)
**Nano-sized powder of alumina

EXAMPLE 1

An alcoholic solution of alkoxysilane oligomer containing about 20% by weight of siliceous components (which has a weight averaged molecular weight (Mw) of 2240 and is hereinafter referred to as "alkoxysilane oligomer 1") was obtained by diluting tetraethoxysilane with isopropyl alcohol and condensation polymerizing the tetraethoxysilane by adding water and an acid catalyst (1 Normal hydrochloric acid). A metal surface treatment agent (a clear and colorless liquid) of EXAMPLE 1 was obtained by mixing 8 parts by weight of ethyl Cellosolve with 72 parts by weight of the alcoholic solution of alkoxysilane oligomer 1.

The metal surface treatment agent was applied to three electro-galvanized M8 (8 mm) hexagon headed bolts having a plating thickness of about 6 μm formed in a zinc cyanide bath (half screwed M8 bolts having a total length of about 50 mm, as-galvanized and dried but not chromated products being kept in a container containing a volatile corrosion inhibitor; these conditions applying also to the following embodiments) by the dip-spin coating method which comprises immersing the three bolts in the metal surface treatment agent, taking the bolts out of the metal surface treatment agent and spinning off an excessive amount of the metal surface treatment agent by centrifugal force (radius of rotation: 15 cm, revolution speed: 400 RPM) and the applied film was dried and baked at 180° C. for 15 minutes. These three surface-treated bolts were put in a salt spray tester (in accordance with JIS Z2371) and rust inhibitive performance was investigated. As a result, the occurrence of white rusting was observed in two out of the three bolts after a lapse of 408 hours. The three bolts were continuously kept in the salt spray tester, but the occurrence of red rusting was not observed even after a lapse of 2000 hours.

Incidentally, the weight averaged molecular weight (Mw) of the alkoxysilane oligomer was determined by use of a gel-permeation chromatograph made by Tosoh Corporation (HLC-8120GPC) by using tetrahydrofuran as a solvent and preparing calibration curves with polystyrene standard resin. Also in the alkoxysilane oligomers used in EXAMPLES and COMPARATIVE EXAMPLES below, the weight averaged molecular weight (Mw) was determined in the same manner.

EXAMPLE 2

In EXAMPLE 2, by use of the same alcoholic solution of alkoxysilane oligomer 1 as in EXAMPLE 1 a metal surface treatment agent was made by substituting butyl Cellosolve for ethyl Cellosolve as a high boiling point alcohol to be mixed. The metal surface treatment agent contains 72 parts by weight of alcoholic solution of alkoxysilane oligomer 1 and 8 parts by weight of butyl Cellosolve.

In the same manner as in EXAMPLE 1, the metal surface treatment agent thus made was applied to three electro-galvanized M8 hexagon headed bolts having a plating thickness of about 6 μm formed in a zinc cyanide bath and the applied film agent was dried and baked. These three bolts were put in the salt spray tester and rust inhibitive performance was investigated. As a result, the occurrence of white rusting was observed in two out of the three bolts after a lapse of 336 hours. And the three bolts were continuously kept in the salt spray tester, but the occurrence of red rusting was not observed even after a lapse of 2000 hours.

EXAMPLE 3

By use of the same alcoholic solution of alkoxysilane oligomer 1 as in EXAMPLE 1 a metal surface treatment agent was made by substituting propylene glycol monomethyl ether for ethyl Cellosolve as a high boiling point alcohol to be mixed. The metal surface treatment agent contains 72 parts by weight of alcoholic solution of alkoxysilane oligomer 1 and 8 parts by weight of propylene glycol monomethyl ether.

In the same manner as in EXAMPLE 1, the metal surface treatment agent thus made was applied to three electro-galvanized M8 hexagon headed bolts having a plating thickness of about 6 μm formed in a zinc cyanide bath and the applied film was dried and baked. These three bolts were put in the salt spray tester and rust inhibitive performance was investigated. As a result, the occurrence of white rusting was observed in two out of the three bolts after a lapse of 324 hours. And the three bolts were continuously kept in the salt spray tester, but the occurrence of red rusting was not observed even after a lapse of 2000 hours.

EXAMPLE 4

By use of the same alcoholic solution of alkoxysilane oligomer 1 as in EXAMPLE 1 a metal surface treatment agent of EXAMPLE 4 was prepared as follows. A polyvinyl butyral resin (BM-1 made by Sekisui Chemical Co., Ltd., a product of medium molecular weight) was dissolved in ethyl Cellosolve to obtain a 10% by weight solution, mixing 5 parts by weight of this solution with 70 parts by weight of the alcoholic solution of alkoxysilane oligomer 1, and further mixing 5 parts by weight of ethyl Cellosolve.

In the same manner as in EXAMPLE 1, the metal surface treatment agent thus made was applied to three electro-galvanized M8 hexagon headed bolts having a plating thickness of about 6 μm formed in a zinc cyanide bath and the applied metal surface treatment agent was dried and baked at 180° C. These three bolts were put in the salt spray tester and rust inhibitive performance was investigated. As a result, the occurrence of white rusting was observed in two out of the three bolts after a lapse of 552 hours. And the three bolts were continuously kept in the salt spray tester, but the occurrence of red rusting was not observed even after a lapse of 2000 hours.

EXAMPLE 5

By use of the same alcoholic solution of alkoxysilane oligomer 1 as in EXAMPLE 1 a metal surface treatment agent of EXAMPLE 5 was prepared as follows. 64 parts by weight of the alcoholic solution of alkoxysilane oligomer 1 was mixed with 8 parts by weight of a silane coupling agent (TSL-8350 made by GE Toshiba Silicones, which has an epoxy functional group and contains about 25% by weight of silica components) and 8 parts by weight of an ethyl Cellosolve solution containing 10% by weight of a polyvinyl butyral resin (BM-1 made by Sekisui Chemical Co., Ltd.).

In the same manner as in EXAMPLE 1, the metal surface treatment agent thus made was applied to three electro-galvanized M8 hexagon headed bolts having a plating thickness of about 6 μm formed in a zinc cyanide bath and the applied metal surface treatment agent was dried and baked at 180° C. These three bolts were put in the salt spray tester and rust inhibitive performance was investigated. As a result, the occurrence of white rusting was observed in two out of the three bolts after a lapse of 348 hours. And the three bolts were continuously kept in the salt spray tester, but the occurrence of red rusting was not observed even after a lapse of 2000 hours.

EXAMPLE 6

By use of the same alcoholic solution of alkoxysilane oligomer 1 as in EXAMPLE 1 a metal surface treatment agent of EXAMPLE 6 was prepared as follows. 64 parts by weight of the alcoholic solution of alkoxysilane oligomer 1 was mixed with 8 parts by weight of a silane coupling agent (A-171 made by Nippon Unicar Co., Ltd., which has a vinyl functional group and contains about 25% by weight of silica components) and 8 parts by weight of an ethyl Cellosolve solution containing 10% by weight of a polyvinyl butyral resin (BL-1 made by Sekisui Chemical Co., Ltd., a product having a low molecular weight).

In the same manner as in EXAMPLE 1, the metal surface treatment agent thus made was applied to three electro-galvanized M8 hexagon headed bolts having a plating thickness of about 6 μm formed in a zinc cyanide bath and the applied metal surface treatment agent was dried and baked at 180° C. These three bolts were put in the salt spray tester and rust inhibitive performance was investigated. As a result, the occurrence of white rusting was observed in two out of the three bolts after a lapse of 528 hours. And the three bolts were continuously kept in the salt spray tester, but the occurrence of red rusting was not observed even after a lapse of 2000 hours.

EXAMPLE 7

By use of the same alcoholic solution of alkoxysilane oligomer 1 as in EXAMPLE 1 a metal surface treatment agent of EXAMPLE 7 was prepared as follows. 64 parts by weight of the alcoholic solution of alkoxysilane oligomer 1 was mixed with 8 parts by weight of a silane coupling agent (A-171 made by Nippon Unicar Co., Ltd.) and 8 parts by weight of an ethyl Cellosolve solution containing 10% by weight of a polyvinyl butyral resin (BM-1 made by Sekisui Chemical Co., Ltd.).

In the same manner as in EXAMPLE 1, the metal surface treatment agent thus made was applied to three electro-galvanized M8 hexagon headed bolts having a plating thickness of about 6 μm formed in a zinc cyanide bath and the applied metal surface treatment agent was dried and baked at 180° C. These three bolts were put in the salt spray tester and rust inhibitive performance was investigated. As a result, the occurrence of white rusting was observed in two out of the three bolts after a lapse of 552 hours. And the three bolts were continuously kept in the salt spray tester, but the occurrence of red rusting was not observed even after a lapse of 2000 hours.

EXAMPLE 8

By use of the same alcoholic solution of alkoxysilane oligomer 1 as in EXAMPLE 1 a metal surface treatment agent of EXAMPLE 8 was prepared as follows. 60 parts by weight of the alcoholic solution of alkoxysilane oligomer 1 was mixed with 5 parts by weight of a silane coupling agent (TSL8350 made by GE Toshiba Silicones), 5 parts by weight of a propylene glycol monomethyl ether solution containing 20% by weight of a phenol resin (PR-5524 made by Sumitomo Bakelite Company Limited) and 10 parts by weight of propylene glycol monomethyl ether.

In the same manner as in EXAMPLE 1, the metal surface treatment agent thus made was applied to three electro-galvanized M8 hexagon headed bolts having a plating thickness of about 6 μm formed in a zinc cyanide bath and the applied metal surface treatment agent was dried and baked. These three bolts were put in the salt spray tester and rust inhibitive performance was investigated. As a result, the occurrence of white rusting was observed in two out of the three bolts after a lapse of 408 hours. And the three bolts were continuously kept in the salt spray tester, though the occurrence of red rusting was not observed even after a lapse of 2000 hours.

EXAMPLE 9

An alcoholic solution of alkoxysilane oligomer having about 18% by weight of silica components (which has a weight averaged molecular weight (Mw) of 5350 and is hereinafter referred to as "alkoxysilane oligomer 2") was prepared by diluting tetraethoxysilane with ethyl alcohol and hydrolyzed condensation polymerizing the tetraethoxysilane by adding water and an acid catalyst (hydrochloric acid). A metal surface treatment agent of EXAMPLE 9 was prepared as follows. 70 parts by weight of alcoholic solution of the alkoxysilane oligomer 2 was mixed with 5 parts by weight of a silane coupling agent (TSL8350 made by GE Toshiba Silicones) and 5 parts by weight of an ethyl Cellosolve solution containing 10% by weight of a polyvinyl butyral resin (BM-1 made by Sekisui Chemical Co., Ltd.).

In the same manner as in EXAMPLE 1, the metal surface treatment agent thus made was applied to three electro-galvanized M8 hexagon headed bolts having a zinc plating thickness of about 6 μm formed in a zinc cyanide bath and the applied metal surface treatment agent was dried and baked. These three bolts were put in the salt spray tester and rust inhibitive performance was investigated. As a result, the occurrence of white rusting was observed in two out of the three bolts after a lapse of 432 hours. And the three bolts were continuously kept in the salt spray tester, though the occurrence of red rusting was not observed even after a lapse of 2000 hours.

EXAMPLE 10

An alcoholic solution of alkoxysilane oligomer having about 10% by weight of silica components (which has a weight averaged molecular weight (Mw) of 8070 and is hereinafter referred to as "alkoxysilane oligomer 3") was prepared by diluting tetraethoxysilane with isopropyl alcohol and hydrolyzed condensation polymerizing the tetraethoxysilane by adding water and an acid catalyst (hydrochloric acid). A metal surface treatment agent of EXAMPLE 10 was prepared as follows. 8 parts by weight of ethyl Cellosolve was mixed with 72 parts by weight of the alcoholic solution of alkoxysilane oligomer 3.

In the same manner as in EXAMPLE 1, the metal surface treatment agent thus made was applied to three electro-galvanized M8 hexagon headed bolts having a zinc plating thickness of about 6 μm formed in a zinc cyanide bath and the applied metal surface treatment agent was dried and baked. These three bolts were put in the salt spray tester and rust inhibitive performance was investigated. As a result, the occurrence of white rusting was observed in two out of the three bolts after a lapse of 324 hours. And the three bolts were continuously kept in the salt spray tester, though the occurrence of red rusting was not observed even after a lapse of 2000 hours.

EXAMPLE 11

A slurry was prepared by mixing a nano-sized powder of titanium dioxide (Super Titania F-6 made by Showa Denko K. K., average particle size of primary particles: about 15 nm) with propylene glycol monomethyl ether and was dispersed for about 50 hours in a ball mill, which uses equal amounts of zirconia balls having a diameter of 5 mm and a diameter of 3 mm) and a dispersed slurry containing 16.7% by weight of a nano-sized titanium dioxide powder was obtained. A metal surface treatment agent of EXAMPLE 11 was prepared by mixing 70 parts by weight of the alcohol solution of alkoxysilane oligomer 1 used in EXAMPLE 1, 5 parts by weight of a silane coupling agent (TSL8350 made by GE Toshiba Silicones), 4 parts by weight of the prepared nano-sized titanium dioxide powder slurry, 5 parts by weight of a propylene glycol monomethyl ether solution containing 10% by weight of a polyvinyl butyral resin (BM-1 made by Sekisui Chemical Co., Ltd.), and 5 parts by weight of propylene glycol monomethyl ether. The blending ratio of the nano-sized titanium dioxide powder was 4.6 parts by weight to 100 parts by weight of the silica components in the metal surface treatment agent (because the silica component contained in the alcoholic solution of alkoxysilane oligomer 1 is 20% of 70 parts by weight and the silica component contained in the silane coupling agent is 25% of 5 parts by weight, the total of the two is 15.3 parts by weight).

In the same manner as in EXAMPLE 1, the metal surface treatment agent thus made was applied to three electro-galvanized M8 hexagon headed bolts having a zinc plating thickness of about 6 μm plated in a zinc cyanide bath and the applied metal surface treatment agent was dried and baked at 180° C. These three bolts were put in the salt spray tester and rust inhibitive performance was investigated. As a result, the occurrence of white rusting was observed in two out of the three bolts after a lapse of 624 hours. And the three bolts were continuously kept in the salt spray tester, though the occurrence of red rusting was not observed even after a lapse of 2000 hours.

EXAMPLE 12

A mixed slurry of a nano-sized powder of titanium dioxide (Super Titania F-6 made by Showa Denko K. K.) and ethyl Cellosolve was dispersed for about 50 hours in a ball mill (which uses mixed zirconia balls having diameters of 5 mm and of 3 mm) and a dispersed slurry having 16.7% by weight of a nano-sized titanium dioxide powder was recovered. A metal surface treatment agent of EXAMPLE 12 was prepared by mixing 65 parts by weight of the alcohol solution of alkoxysilane oligomer 1 used in EXAMPLE 1, 5 parts by weight of a silane coupling agent (TSL8350 made by GE Toshiba Silicones), 8 parts by weight of the dispersed nano-sized titanium dioxide powder, 5 parts by weight of an ethyl Cellosolve solution containing 10% by weight of polyvinyl butyral resin (BM-1 made by Sekisui Chemical Co., Ltd.), and 5 parts by weight of ethyl Cellosolve. The blending ratio of the nano-sized powder of titanium dioxide was 9.1 parts by weight to 100 parts by weight of the silica components in the metal surface treatment agent (because the silica component contained in the alcoholic solution of alkoxysilane oligomer 1 is 20% of 65 parts by weight and the silica component contained in the silane coupling agent is 25% of 5 parts by weight, the total of the two is 14.3 parts by weight).

In the same manner as in EXAMPLE 1, the metal surface treatment agent thus made was applied to six electro-galvanized M8 hexagon headed bolts having a zinc plating thickness of about 6 μm formed in a zinc cyanide bath and the applied metal surface treatment agent was dried and baked at 180° C. Three out of these six bolts were put in the salt spray tester and rust inhibitive performance was investigated. As a result, the occurrence of white rusting was observed in two out of the three bolts after a lapse of 624 hours. And the three bolts were continuously kept in the salt spray tester, though the occurrence of red rusting was not observed even after a lapse of 2000 hours.

In each of the remaining three bolts, the bolt surface was cut by a cutting knife until the substrate is reached. When these three injured bolts were put in the salt spray tester and rust inhibitive performance was investigated, they exhibited almost the same rust inhibitive performance.

EXAMPLE 13

A slurry containing 16.7% by weight of a nano-sized titanium dioxide powder (Super Titania F-6 made by Showa Denko K. K.) in butyl Cellosolve was dispersed for about 50 hours in a ball mill (which uses a mixture of balls consisting of equal amounts by weight of zirconia balls having a diameter of 5 mm and a diameter of 3 mm). A metal surface treatment agent of EXAMPLE 13 was prepared by mixing 70 parts by weight of the alcohol solution of alkoxysilane oligomer 1 used in EXAMPLE 1, 5 parts by weight of a silane coupling agent (TSL8350 made by GE Toshiba Silicones), 8 parts by weight of the nano-sized powder slurry of titanium dioxide, 5 parts by weight of a butyl Cellosolve solution containing 10% by weight of a polyvinyl butyral resin (BM-1 made by Sekisui Chemical Co., Ltd.), and 5 parts by weight of butyl Cellosolve. The blending ratio of the nano-sized powder of titanium dioxide was 8.3 parts by weight to 100 parts by weight of the silica components in the metal surface treatment agent (because the silica component contained in the alcoholic solution of alkoxysilane oligomer 1 is 20% of 70 parts by weight and the silica component contained in the silane coupling agent is 25% of 5 parts by weight, the total of the two is 15.3 parts by weight).

In the same manner as in EXAMPLE 1, the metal surface treatment agent thus made was applied to three electro-galvanized M8 hexagon headed bolts having a zinc plating thickness of about 6 μm formed in a zinc cyanide bath and the applied metal surface treatment agent was dried and baked at 180° C. These three bolts were put in the salt spray tester and rust inhibitive performance was investigated. As a result, the occurrence of white rusting was observed in two out of the three bolts after a lapse of 372 hours. And the three bolts were continuously kept in the salt spray tester, though the occurrence of red rusting was not observed even after a lapse of 2000 hours.

EXAMPLE 14

A metal surface treatment agent of EXAMPLE 14 was prepared by mixing 70 parts by weight of the alcohol solution of alkoxysilane oligomer 2 used in EXAMPLE 9, 5 parts by weight of a silane coupling agent (TSL8350 made by GE Toshiba Silicones), 8 parts by weight of the nano-sized titanium dioxide powder slurry prepared in EXAMPLE 12, and 5 parts by weight of an ethyl Cellosolve solution containing 10% by weight of a polyvinyl butyral resin (BM-1 made by Sekisui Chemical Co., Ltd.). The blending ratio of the nano-sized powder of titanium dioxide was 9.3 parts by weight to 100 parts by weight of the silica components in the metal surface treatment agent (because the silica component contained in the alcoholic solution of alkoxysilane oligomer 2 is 18% of 70 parts by weight and the silica component contained in the silane coupling agent is 25% of 5 parts by weight, the total of the two is 13.9 parts by weight).

In the same manner as in EXAMPLE 1, the metal surface treatment agent thus made was applied to three electro-galvanized M8 hexagon headed bolts having a zinc plating thickness of about 6 μm formed in a zinc cyanide bath and the applied metal surface treatment agent was dried and baked at 180° C. These three bolts were put in the salt spray tester and rust inhibitive performance was investigated. As a result, the occurrence of white rusting was observed in two out of the three bolts after a lapse of 348 hours. And the three bolts were continuously kept in the salt spray tester, though the occurrence of red rusting was not observed even after a lapse of 2000 hours.

EXAMPLE 15

A slurry containing 16.7% by weight of a nano-sized titanium dioxide powder (Tanoick A-100 made by Taki Chemical Co., Ltd., average particle size of primary particles: about 8 nm) in ethyl Cellosolve was dispersed for about 50 hours in a ball mill in the same manner as in EXAMPLE 11. A metal surface treatment agent of EXAMPLE 15 was prepared by mixing 70 parts by weight of the alcohol solution of alkoxysilane oligomer 1 used in EXAMPLE 1, 5 parts by weight of a silane coupling agent (TSL8350 made by GE Toshiba Silicones), 8 parts by weight of the above-described dispersed slurry of nano-sized titanium dioxide powder, and 5 parts by weight of an ethyl Cellosolve solution containing 10% by weight of a polyvinyl butyral resin (BM-1 made by Sekisui Chemical Co., Ltd.). The blending ratio of the nano-sized powder of titanium dioxide was 8.5 parts by weight to 100 parts by weight of the silica components in the metal surface treatment agent (because the silica component contained in the alcoholic solution of alkoxysilane oligomer 1 is 20% of 70 parts by weight and the silica component contained in the silane coupling agent is 25% of 5 parts by weight, the total of the two is 15.3 parts by weight).

In the same manner as in EXAMPLE 1, the metal surface treatment agent thus made was applied to three electro-galvanized M8 hexagon headed bolts having a zinc plating thickness of about 6 μm formed in a zinc cyanide bath and the applied metal surface treatment agent was dried and baked at 180° C. These three bolts were put in the salt spray tester and rust inhibitive performance was investigated. As a result, the occurrence of white rusting was observed in two out of the three bolts after a lapse of 324 hours. And the three bolts were continuously kept in the salt spray tester, though the occurrence of red rusting was not observed even after a lapse of 2000 hours.

EXAMPLE 16

A silica-based sol-gel binder (Ceramica G-92-6 binder of Nippan Kenkyujo Co., Ltd., a silica-based sol-gel alcoholic solution containing about 20% by weight of solid content that contains about 20% by weight of alumina component in the solid content) was used as the siliceous binder. A slurry containing 16.9% by weight of a nano-sized titanium dioxide powder (a product of C. I. Kasei Co., Ltd., anatase type NanoTek titanium dioxide, average grain size of primary particles: about 30 nm) in isopropyl alcohol was prepared, and the slurry was dispersed for 18 hours in a ball mill (which uses a mixture of balls consisting of equal amounts by weight of zirconia balls having a diameter of 5 mm and of 3 mm, the same applies to the following examples). A metal surface treatment agent of EXAMPLE 16 was prepared by mixing 16 parts by weight of the dispersed nano-sized titanium dioxide powder slurry and 80 parts by weight of the silica-based binder. The proportion of the nano-sized powder of titanium dioxide was 16.9 parts by weight to 100 parts by weight of the solid content in the metal surface treatment agent (20% of 80 parts by weight).

In the same manner as in EXAMPLE 1, the metal surface treatment agent of EXAMPLE 16 was applied to three electro-galvanized M8 hexagon headed bolts having a zinc plating thickness of about 6 μm formed in a zinc cyanide bath and the applied metal surface treatment agent was dried and baked at 180° C. Although the appearance of the bolts after the surface treatment was somewhat whitish, the metal luster of galvanizing was maintained. These three bolts were put in the salt spray tester and rust inhibitive performance was evaluated. The occurrence of white rusting was observed in two out of the three bolts after a lapse of 192 hours. The salt spray test was continued after that, and the time when red rusting was observed in two out of the three bolts was 1574 hours.

EXAMPLE 17

A water reducible silica sol binder (Ceramica S-100 binder, prepared by Nippan Kenkyujo Co., Ltd., containing about 20% by weight of silica component, pH 10.5) was used as a siliceous binder. A slurry containing 15.4% by weight of titanium dioxide was obtained by mixing the same nano-sized powder of titanium dioxide as in EXAMPLE 16 into ion exchanged water, and by dispersing the slurry for 18 hours in a ball mill. A metal surface treatment agent of EXAMPLE 17 was prepared by mixing 20 parts by weight of the slurry and 80 parts of the binder, further adding 3 drops (about 68 mg) of Dynol 604 (a product of Nisshin Chemical Industry Co., Ltd.) as a wetting agent. The proportion of the nano-sized titanium dioxide powder was 19.4 parts by weight to 100 parts by weight of the silica component (20% of 80 parts by weight).

In the same manner as in EXAMPLE 1, the metal surface treatment agent of EXAMPLE 17 was applied to three electrogalvanized M8 hexagon headed bolts having a zinc plating thickness of about 6 μm formed in a zinc cyanide bath and the applied metal surface treatment agent was dried and baked at 180° C. Although the appearance of the bolts after the surface treatment was somewhat whitish, the metal luster of galvanizing was maintained. These three bolts were put in the salt spray tester and rust inhibitive performance was evaluated. The occurrence of white rusting was observed in two out of the three bolts after a lapse of 72 hours. The salt spray test was continued after that, but the occurrence of red rusting was not observed even after a lapse of 2000 hours.

EXAMPLE 18

A slurry containing about 19.2% by weight of titanium dioxide powder was obtained by mixing a nano-sized titanium dioxide powder (a product of Idemitsu Kosan Co., Ltd., average grain size of primary particles: about 17 nm) with isopropyl alcohol, and by dispersing the slurry for about 18 hours in a ball mill which uses the mixed zirconia balls. A metal surface treatment agent of EXAMPLE 18 was prepared by mixing 20 parts by weight of the slurry and 80 parts by weight of the sol-gel binder used in EXAMPLE 16. The proportion of the nano-sized titanium dioxide powder was 24 parts by weight to 100 parts by weight of the silica component (20% of 80 parts by weight).

In the same manner as in EXAMPLE 1, the metal surface treatment agent of EXAMPLE 18 was applied to three electro-galvanized M8 hexagon headed bolts having a zinc plating thickness of about 6 μm formed in a zinc cyanide bath and the applied metal surface treatment agent was dried and baked at 180° C. Although the appearance of the bolts after the surface treatment was somewhat whitish, the metal luster of galvanizing was maintained. These three bolts were put in the salt spray tester and rust inhibitive performance was evaluated. The occurrence of white rusting was observed in two out of the three bolts after a lapse of 216 hours. The salt spray test was continued after that, but the occurrence of red rusting was not observed even after a lapse of 2000 hours.

EXAMPLE 19

A slurry containing about 15.4% by weight of titanium dioxide powder was obtained by mixing the nano-sized titanium dioxide powder used in EXAMPLE 18 with ion exchanged water, and by dispersing the slurry for about 18 hours in a ball mill which uses the mixed zirconia balls, a dispersed slurry of a nano-sized titanium dioxide powder was obtained. A metal surface treatment agent of EXAMPLE 19 was prepared by mixing 20 parts by weight of the slurry and 80 parts by weight of the water reducible silica sol binder used in EXAMPLE 17, and further adding 3 drops of Dynol 604 as a wetting agent. The proportion of the nano-sized powder of titanium dioxide was 19.4 parts by weight to 100 parts by weight of the silica component (20% of 80 parts by weight).

In the same manner as in EXAMPLE 1, the metal surface treatment agent of EXAMPLE 19 was applied to three electro-galvanized M8 hexagon headed bolts having a zinc plating thickness of about 6 μm formed in a zinc cyanide bath and the applied metal surface treatment agent was dried and baked at 180° C. Although the appearance of the bolts after the surface treatment was somewhat whitish, the metal luster of galvanizing was maintained. These three bolts were put in the salt spray tester and rust inhibitive performance was evaluated. The occurrence of white rusting was observed in two out of the three bolts after a lapse of 72 hours. When the salt spray test was continued after that, the occurrence of red rusting was observed in two bolts after a lapse of 1752 hours.

EXAMPLE 20

A slurry containing about 15.4% by weight of titanium dioxide powder was obtained by mixing a nano-sized titanium dioxide powder (Super Titania F-4 made by Showa Denko K. K., average particle size of primary particles: about 30 nm) with ion exchanged water, and by dispersing the slurry for about 18 hours in a ball mill which uses the mixed zirconia balls, a dispersed slurry of a nano-sized titanium dioxide powder was obtained. A metal surface treatment agent of EXAMPLE 20 was obtained by mixing 16 parts by weight of the slurry and 80 parts by weight of the silica-based sol-gel binder used in EXAMPLE 16 and further adding 3 drops of Dynol 604 as a wetting agent. The proportion of the nano-sized powder of titanium dioxide was 15.6 parts by weight to 100 parts by weight of the silica component (20% of 80 parts by weight).

In the same manner as in EXAMPLE 1, the metal surface treatment agent of EXAMPLE 20 was applied to three electro-galvanized M8 hexagon headed bolts having a zinc plating thickness of about 6 μm formed in a zinc cyanide bath and the applied metal surface treatment agent was dried and baked at 180° C. These three bolts were put in the salt spray tester and rust inhibitive performance was evaluated. The occurrence of white rusting was observed in two out of the three bolts after a lapse of 72 hours. When the salt spray test was continued after that, the occurrence of red rusting was observed in two bolts after a lapse of 1646 hours.

EXAMPLE 21

The metal surface treatment agent of EXAMPLE 21 was obtained by mixing 16 parts by weight of the dispersed slurry used in EXAMPLE 17 and 80 parts by weight of a water reducible colloidal silica binder containing about 20% by weight of silica component (Snowtex XS made by Nissan Chemical Industries, Ltd., average size of colloidal particles: 4 to 6 nm), and further adding 3 drops (about 68 mg) of Dynol 604 as a wetting agent. The proportion of the nano-sized powder of titanium dioxide was 15.6 parts by weight to 100 parts by weight of the solid component of the binder (20% of 80 parts by weight).

In the same manner as in EXAMPLE 1, the metal surface treatment agent of EXAMPLE 21 was applied to three electro-galvanized M8 hexagon headed bolts having a zinc plating thickness of about 6 μm formed in a zinc cyanide bath and the applied metal surface treatment agent was dried and baked at 180° C. These three bolts were put in the salt spray tester and rust inhibitive performance was evaluated. The occurrence of white rusting was observed in two out of the three bolts after a lapse of 72 hours. When the salt spray test was continued after that, the occurrence of red rusting was observed in two bolts after a lapse of 1368 hours.

EXAMPLE 22

A slurry containing about 16.6% by weight of titanium dioxide powder was obtained by mixing a nano-sized powder of titanium dioxide (Tainock A-100 made by Taki Chemical Co., Ltd.) with ion exchanged pure water, and by dispersing the slurry for about 18 hours in a ball mill which uses the mixed zirconia balls, a dispersed slurry of a nano-sized titanium dioxide powder was obtained. A metal surface treatment agent of EXAMPLE 22 was obtained by mixing 16 parts by weight of the slurry and 80 parts by weight of the water reducible colloidal silica binder used in EXAMPLE 21, and further adding 3 drops (about 68 mg) of Dynol 604 as a wetting agent. The proportion of the nano-sized powder of titanium dioxide was 16.9 parts by weight to 100 parts by weight of the silica component (20% of 80 parts by weight).

In the same manner as in EXAMPLE 1, the metal surface treatment agent of EXAMPLE 22 was applied to three electro-galvanized M8 hexagon headed bolts having a zinc plating thickness of about 6 μm plated in a zinc cyanide bath and the applied metal surface treatment agent was dried and baked at 180° C. These three bolts were put in the salt spray tester and rust inhibitive performance was evaluated. The occurrence of white rusting was observed in two out of the three bolts after a lapse of 72 hours. When the salt spray test was continued after that, the occurrence of red rusting was observed in two bolts after a lapse of 1752 hours.

EXAMPLE 23

A slurry containing about 16.6% by weight of titanium dioxide powder was obtained by mixing a nano-sized titanium dioxide powder (Tainock A-100 made by Taki Chemical Co., Ltd.) with ion exchanged water, and by dispersing the slurry for 42 hours in a ball mill, a dispersed slurry of a nano-sized titanium dioxide powder was obtained. A metal surface treatment agent of EXAMPLE 23 was obtained by mixing 8 parts by weight of this slurry and 80 parts by weight of the water reducible colloidal silica binder used in EXAMPLE 21, and further adding 3 drops (about 68 mg) of Dynol 604 as a wetting agent. The proportion of the nano-sized powder of titanium dioxide was 8.1 parts by weight to 100 parts by weight of the silica component (20% of 80 parts by weight).

In the same manner as in EXAMPLE 1, the metal surface treatment agent of EXAMPLE 23 was applied to three electro-galvanized M8 hexagon headed bolts having a zinc plating a thickness of about 6 μm plated in a zinc cyanide bath and the applied metal surface treatment agent was dried and baked at 180° C. These three bolts were put in the salt spray tester and rust inhibitive performance was evaluated. The occurrence of white rusting was observed in two out of the three bolts after a lapse of 72 hours. When the salt spray test was continued after that, the occurrence of red rusting was observed in two bolts after a lapse of 1368 hours.

EXAMPLE 24

A slurry containing 16.6% by weight of titanium dioxide powder was obtained by mixing a nano-sized titanium dioxide powder (Super Titania F-6 made by Showa Denko K. K.) with ethyl Cellosolve, and then by dispersing the slurry for about 42 hours in a ball mill which uses the mixed zirconia balls, a dispersed slurry of the nano-sized titanium dioxide powder was obtained. 72 parts by weight of the water reducible colloidal silica binder used in EXAMPLE 21 was mixed with 8 parts by weight of a silane coupling agent (TSL8350 made by GE Toshiba Silicones) and 3 drops of Dynol 604, which was then mixed with 8 parts by weight of the dispersed slurry of the nano-sized titanium dioxide powder to produce a metal surface treatment agent of EXAMPLE 24. The blending ratio of the nano-sized powder of titanium dioxide was 7.9 parts by weight to 100 parts by weight of the silica components (because the silica component contained in the water reducible silica-based binder is 20% of 72 parts by weight and the silica component contained in the water soluble silane coupling agent is 25% of 8 parts by weight, the total of the two is 16.4 parts by weight).

In the same manner as in EXAMPLE 1, the metal surface treatment agent thus made was applied to three electro-galvanized M8 hexagon headed bolts having a zinc plating thickness of about 6 μm plated in a zinc cyanide bath and the applied metal surface treatment agent was dried and baked at 180° C. These three bolts were put in the salt spray tester and rust inhibitive performance was investigated. As a result, the occurrence of white rusting was observed in two out of the three bolts after a lapse of 168 hours. The three bolts were continuously kept in the salt spray tester, but the occurrence of red rusting was not observed even after a lapse of 2000 hours.

EXAMPLE 25

A water-repellent flaky zinc powder was prepared by treating with hydrolyzed n-hexyl trimethoxysilane (a silane compound having hydrophobic groups made by Nippon Unicar Co., Ltd.) in alcohol and adding the hydrolyzed product to particulate surfaces of a flaky zinc powder containing 14% by weight of a flaky aluminum powder. A chromium-free rust inhibitive paint for metals (a type of chromium-free zinc rich paint) was prepared by mixing 100 parts by weight of the flaky zinc powder, 1.84 parts by weight of a water reducible block isocyanate resin emulsion (Prominate made by Gantz Chemical Co., Ltd., which contains 45% by weight of resin component, that is, 0.83 parts by weight), 55.3 parts by weight of β-(3,4-epoxycyclohexyl)ethyl triethoxysilane (a water soluble silane coupling agent having an epoxy-functional group, Coatcill 1770 made by Nippon Unicar Co., Ltd.), 85.8 parts by weight of polyethylene glycol having a molecular weight of about 1000 which is a solid at room temperature, 2.8 parts by weight of nonionic natural alcohol ethoxylate (a surfactant having an HLB value of 12.9, made by Asahi Denka Co., Ltd.), 2.8 parts by weight of boric acid and 85.8 parts by weight of water, and by stirring for 24 hours.

The rust inhibitive paint prepared as described above was applied by the dip-spin coating method to six degreased M8 hexagon headed steel bolts (half screw having a length of about 50 mm) and the applied rust inhibitive paint was baked at 250° C. and the coating operation was repeated twice. The thickness of the rust inhibitive paints applied to the M8 bolts was measured by use of a paint thickness measuring instrument (P. I. G455 made by Eriksen). The paint thickness was about 11 μm. The metal surface treatment agent prepared in EXAMPLE 12 was applied once to the three rust inhibitive painted M8 hexagon headed bolts and the applied metal surface treatment agent was dried and baked at 180° C. for 15 minutes. These three M8 bolts were put in the salt spray tester and rust inhibitive performance was investigated. As a result, the occurrence of white rusting was observed in two out of the three bolts after a lapse of 648 hours. The three bolts were continuously kept in the salt spray tester after that, but the occurrence of red rusting was not observed even after a lapse of 2000 hours.

EXAMPLE 26

Sermaguard 1407 (a chromium-free water reducible zinc-rich paint made by Sermatec International (USA) in which a granular metal zinc powder having an average particle size of about 5 μm is used as a rust inhibitive pigment) was applied once to a surface of a cast iron piece by the dip-spin coating method and dried by being left to stand in a room until the next day.

Separately, a slurry containing 16.6% by weight of titanium dioxide powder was obtained by mixing a nano-sized powder of titanium dioxide (Super Titania F-6 made by Showa Denko K. K.) with ethyl Cellosolve, and by dispersing the slurry for about 42 hours in a ball mill which uses the mixed zirconia balls, a dispersed slurry of a nano-sized titanium dioxide powder was obtained. A metal surface treatment agent of EXAMPLE 26 was obtained by mixing 8 parts by weight of the slurry of a nano-sized titanium dioxide powder to 80 parts by weight of alkoxysilane oligomer 1.

The metal surface treatment agent of EXAMPLE 26 was applied once by the dip-spin coating method to the cast iron piece painted with Sermaguard 1407 and the applied metal surface treatment agent was dried and baked at 180° C. for 15 minutes. The coating thickness was investigated by taking a section micrograph of the cast iron piece. The paint coating thickness was about 25 μm and the film thickness of the metal surface treatment agent was a little less than 2 μm. Both a cast iron piece which is painted only with the zinc rich paint and a cast iron piece in which the metal surface treatment agent was top-coated to a paint coating of the zinc rich paint were put in the salt spray tester and rust inhibitive performance was investigated. In the former, the occurrence of white rusting was observed after a lapse of 48 hours and the occurrence of red rusting was observed after a lapse of 912 hours. In the latter, not less than 360 hours passed before the occurrence of white rusting and the occurrence of red rusting was not observed even after a lapse of 2000 hours.

COMPARATIVE EXAMPLE 1

Three electro-galvanized M6 hexagon headed bolts, having a plating thickness of about 6 μm plated in a cyanide bath but not yet treated by chromate, were put in the salt spray tester and rust inhibitive performance was investigated. The occurrence of white rusting was observed on the surfaces of all of the three bolts after a lapse of 24 hours and the occurrence of red rusting was observed on the surfaces of two out of the three bolts after a lapse of 168 hours.

COMPARATIVE EXAMPLE 2

Three electro-galvanized M6 hexagon headed bolts (half screw having a length of about 50 mm), having a plating thickness of about 6 μm plated in a zinc cyanide bath and the surfaces of which had been subjected to yellow chromate treatment, were put in the salt spray tester and rust inhibitive performance was investigated. The occurrence of white rusting was observed on the surfaces of two out of the three bolts after a lapse of 216 hours. When the three bolts were kept in the salt spray tester after that, the occurrence of red rusting was observed on the surfaces of two bolts after a lapse of 1008 hours.

COMPARATIVE EXAMPLE 3

A metal surface treatment agent of COMPARATIVE EXAMPLE 3 was prepared by mixing 8 parts by weight of isopropyl alcohol with 72 parts by weight of a methanol dispersed colloidal silica solution (made by Nissan Chemical Industries, Ltd., silica component: about 40% by weight). In the same manner as in EXAMPLE 1, the metal surface treatment agent was applied by the dip-spin method to three electro-galvanized M8 hexagon headed bolts having a plating thickness of about 6 μm plated in a zinc cyanide bath and the applied metal surface treatment agent was dried and baked at 180° C. for 15 minutes. These three bolts were put in the salt spray tester and rust inhibitive performance was investigated. As a result, the occurrence of white rusting was observed in two out of the three bolts after a lapse of 192 hours. When the three bolts were continuously kept in the salt spray tester after that, the occurrence of red rusting was observed in two bolts after a lapse of 1056 hours.

COMPARATIVE EXAMPLE 4

A silane coupling agent (TSL8350 made by GE Toshiba Silicones) was used as a metal surface treatment agent. In the same manner as in EXAMPLE 1, the metal surface treatment agent was applied by the dip-spin method to three electro-galvanized M8 hexagon headed bolts having a zinc plating thickness of about 6 μm plated in a zinc cyanide bath and the applied metal surface treatment agent was dried and baked at 180° C. for 15 minutes. These three bolts were put in the salt spray tester and rust inhibitive performance was investigated. As a result, the occurrence of white rusting was observed in two out of the three bolts after a lapse of 192 hours. When the three bolts were continuously kept in the salt spray tester after that, the occurrence of red rusting was observed in two bolts after a lapse of 264 hours.

COMPARATIVE EXAMPLE 5

A metal surface treatment agent of COMPARATIVE EXAMPLE 5 was obtained by mixing 8 parts by weight of ethyl Cellosolve and 72 parts by weight of an alcoholic solution of alkoxysilane oligomer having a weight averaged molecular weight of about 760 (concentration of silica component: about 40% by weight, hereinafter referred to as "alkoxysilane oligomer 4"), which is obtained by the hydrolyzed condensation polymerization of tetraalkoxysilane. In the same manner as in EXAMPLE 1, the metal surface treatment agent was applied by the dip-spin method to three electro-galvanized M8 hexagon headed bolts having a zinc plating thickness of about 6 μm plated in a zinc cyanide bath and the applied metal surface treatment agent was dried and baked at 180° C. for 15 minutes. These three bolts were put in the salt spray tester and rust inhibitive performance was investigated. As a result, the occurrence of white rusting was observed in two out of the three bolts after a lapse of 264 hours. When the three bolts were continuously kept in the salt spray tester after that, the occurrence of red rusting was observed in two bolts after a lapse of 1008 hours.

COMPARATIVE EXAMPLE 6

A slurry was prepared by mixing 16.6% by weight of a nano-sized alumina powder (NanoTek alumina made by C. I. Kasei Co., Ltd.) having an average primary particle size of about 33 nm, instead of a nano-sized titanium dioxide powder, with ion exchanged water, and by dispersing the slurry in a ball mill which uses the mixed zirconia balls for 18 hours, a dispersed slurry of the nano-sized alumina powder was obtained. A surface treatment agent of COMPARATIVE EXAMPLE 6 was obtained by mixing 16 parts by weight of the slurry and 80 parts by weight of Snowtex XS, which is a water reducible colloidal silica binder, and further adding 3 drops (about 68 mg) of Dynol 604 as a wetting agent. The surface treatment agent was applied by the dip-spin method to three electro-galvanized M8 hexagon headed bolts having a zinc plating thickness of about 6 μm plated in a cyanide bath and the applied metal surface treatment agent was dried and baked at 180° C. for 10 minutes. These three bolts were put in the salt spray tester and rust inhibitive performance was investigated. The occurrence of white rusting was observed in the three bolts after a lapse of 48 hours and the occurrence of red rusting was observed in two out of the three bolts after a lapse of 168 hours.

COMPARATIVE EXAMPLE 7

A surface treatment agent of COMPARATIVE EXAMPLE 7 was prepared by adding 3 drops of Dynol 604 to 80 parts by weight of a water reducible colloidal silica binder containing about 20% by weight of silica component (Snowtex XS, made by Nissan Chemical Industries, Ltd., average size of colloid particles: 4 to 6 nm). The surface treatment agent was applied by the dip-spin method to three electro-galvanized hexagon headed bolts having a zinc plating thickness of about 6 μm plated in a cyanide bath and the surface treatment agent was dried and baked at 180° C. for 10 minutes. These three bolts were put in the salt spray tester and rust inhibitive performance was investigated. The occurrence of white rusting was observed in the three bolts after a lapse of 48 hours and the occurrence of red rusting was observed in two out of the three bolts after a lapse of 912 hours.

From the above-described EXAMPLES and COMPARATIVE EXAMPLES, it became apparent that the chromate-free metal surface treatment agent of the present invention, in which the dispersed nano-sized titanium dioxide powder is suspended in a siliceous binder solution, can prevent the occurrence of red rusting for a long time when the surface treatment agent is applied once by the dip-spin method to electro-galvanized bolts having a zinc plating thickness of about 6 μm plated in a zinc cyanide bath and the applied surface treatment agent is dried and baked. And it became apparent that when the metal surface treatment agent which contains as an essential component an alcoholic solution of alkoxysilane oligomer having a specific weight averaged molecular weight is applied to such galvanized bolts once by the dip-spin method and baked, it is possible to impart the bolt rust inhibitive performance capable of suppressing the occurrence of white rusting for 300 to 600 hours in a salt spray tester. When an alcoholic solution of alkoxysilane oligomer having a weight averaged molecular weight of smaller than 1000 is used in a metal surface treatment agent, the occurrence of white rusting in the salt spray tester is relatively quick. Furthermore, it became apparent that when a resin soluble in alcohol, in particular, a polyvinyl butyral resin is used in combination in a metal surface treatment agent, the rust inhibitive performance of the metal surface treatment agent is improved, and when a silane coupling agent having a vinyl group or an epoxy group as a functional group and a dispersed nano-sized titanium dioxide powder are mixed in a metal surface treatment agent, the rust inhibitive performance of the metal surface treatment agent is further improved.

It is possible to use the chromium-free metal surface treatment agent of the present invention containing an alcoholic solution of alkoxysilane oligomer having a specific weight averaged molecular weight as a surface treatment agent for a chromium-free zinc-rich paint film containing a zinc powder as a rust inhibitive pigment, and it became apparent that the occurrence of white rusting can be suppressed for a long time.

In the above-described EXAMPLES, galvanized metal products are plated in a cyanide bath. However, the same rust inhibitive performance can be imparted also to galvanized metal products which are galvanized in a zincate bath or a chloride bath. A chromium-free metal surface treatment agent containing an alcoholic solution of alkoxysilane oligomer having a specific weight averaged molecular weight can also be used in the surface treatment of aluminum and aluminum alloys.

What is claimed is:
1. A chromium-free metal surface treatment agent which is a silica-based binder solution which consists essentially of:
  alkoxysilane oligomer having a weight averaged molecular weight of 1,500 to 10000;
  a dispersed nano-sized titanium dioxide powder of 3 to 25 parts by weight per 100 parts by weight of the silica component contained in the silica-based binder solution and the balance being an alcohol solvent;
  wherein the dispersed nano-sized titanium dioxide powder is suspended in the silica-based binder solution, the dispersed nano-sized titanium dioxide powder has an average primary particle size of not more than 70 nm, and the alkoxysilane oligomer is obtained by hydrolyzed condensation polymerization of tetraethoxysilane by adding water and acid catalyst, and
  wherein the concentration of the alkoxysilane oligomer in the silica-based binder solution constitutes 8 to 25% by weight of the silica-based binder solution as silica component which is formed when the chromium-free metal surface treatment agent is applied and solidified.
2. The chromium-free metal surface treatment agent according to claim 1, wherein the silica-based binder solution comprises a dispersed nano-sized titanium dioxide powder of 5 to 20 parts by weight per 100 parts by weight of the silica component contained in the silica-based binder solution, and wherein the dispersed nano-sized titanium dioxide powder has an average primary particle size of not more than 40 nm.

3. The chromium-free metal surface treatment agent according to claim 2, wherein the silica-based binder solution further comprises an alcohol-soluble resin component of 0.2 to 2% by weight.

4. The chromium-free metal surface treatment agent according to claim 3, wherein the alcohol-soluble resin component is polyvinyl butyral.

5. The chromium-free metal surface treatment agent according to claim 2, wherein the silica based binder solution further comprises a silane coupling agent having a vinyl or epoxy group as a functional group.

6. The chromium-free metal surface treatment agent according to claim 2, wherein 5 to 35% by weight of the alcohol contained in the silica-based solution is alcohol having a boiling point higher than 115° C.

7. The chromium-free metal surface treatment agent according to claim 6, wherein the alcohol having a boiling point higher than 115° C. is glycol ether.

8. The chromium-free metal surface treatment agent according to claim 6, wherein the alcohol having a boiling point higher than 115° C. is ethylene glycol monoethyl ether, ethylene glycol monobutyl ether, propylene glycol monomethyl ether or propylene glycol monoethyl ether.

* * * * *